(12) United States Patent
Bono

(10) Patent No.: US 10,691,546 B1
(45) Date of Patent: Jun. 23, 2020

(54) STORAGE MANAGEMENT SYSTEM AND METHOD

(71) Applicant: EMC IP Holding Company, LLC, Hopkinton, MA (US)

(72) Inventor: Jean-Pierre Bono, Westboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 15/799,349

(22) Filed: Oct. 31, 2017

(51) Int. Cl.
| | |
|---|---|
| *G06F 11/00* | (2006.01) |
| *G06F 11/14* | (2006.01) |
| *G06F 11/30* | (2006.01) |
| *G06F 11/34* | (2006.01) |

(52) U.S. Cl.
CPC .......... *G06F 11/142* (2013.01); *G06F 11/301* (2013.01); *G06F 11/3433* (2013.01); *G06F 2201/805* (2013.01); *G06F 2201/815* (2013.01); *G06F 2201/82* (2013.01)

(58) Field of Classification Search
CPC ............. G06F 11/1402; G06F 11/1446; G06F 11/1448; G06F 11/1458
USPC ........................................................ 714/15
See application file for complete search history.

(56) References Cited

U.S. PATENT DOCUMENTS

| | | | | |
|---|---|---|---|---|
| 2012/0017112 A1* | 1/2012 | Broda | .................. | G06F 9/5083 714/4.4 |
| 2013/0036323 A1* | 2/2013 | Goose | ................ | G06F 11/1484 714/4.11 |
| 2015/0012699 A1* | 1/2015 | Rizzo | .................. | G06F 12/0866 711/113 |
| 2015/0372878 A1* | 12/2015 | Ganesan | ................ | H04L 43/16 709/223 |
| 2016/0217010 A1* | 7/2016 | Krishnan | ............ | H04L 67/1008 |

\* cited by examiner

*Primary Examiner* — Sarai E Butler
(74) *Attorney, Agent, or Firm* — Brian J. Colandreo; Mark H. Whittenberger; Holland & Knight LLP

(57) ABSTRACT

A method, computer program product, and computing system for identifying a failing virtualized object within a virtualized computing environment, wherein the failing virtualized object executes one or more server objects. Other virtualized objects included within the virtualized computing environment are analyzed to identify one or more target virtualized objects. The one or more server objects are reassigned from the failing virtualized object to the one or more target virtualized objects.

15 Claims, 4 Drawing Sheets

STORAGE MANAGEMENT SYSTEM AND METHOD

TECHNICAL FIELD

This disclosure relates to storage management systems and methods and, more particularly, to storage management systems and methods for use within high-availability data storage systems.

BACKGROUND

In today's IT infrastructure, high availability is very important. And the storing and safeguarding of electronic content is of paramount importance in modern business. Accordingly, high-availability storage systems may be utilized to protect and provide availability to such electronic content, wherein various systems and methodologies (e.g., virtualization systems and methods) may be utilized to enhance the manner in which such electronic content is presented to the user.

SUMMARY OF DISCLOSURE

In one implementation, a computer-implemented method is executed on a computing device and includes identifying a failing virtualized object within a virtualized computing environment, wherein the failing virtualized object executes one or more server objects. Other virtualized objects included within the virtualized computing environment are analyzed to identify one or more target virtualized objects. The one or more server objects are reassigned from the failing virtualized object to the one or more target virtualized objects.

One or more of the following features may be included. The failing virtualized object may be chosen from the group consisting of a virtual machine and a container. Analyzing other virtualized objects included within the virtualized computing environment to identify one or more target virtualized objects may include determining a workload experienced by each of the other virtualized objects included within the virtualized computing environment. Analyzing other virtualized objects included within the virtualized computing environment to identify one or more target virtualized objects may include determining a quantity of server objects being executed by each of the other virtualized objects included within the virtualized computing environment. Reassigning the one or more server objects from the failing virtualized object to the one or more target virtualized objects may include reassigning a first server object from the failing virtualized object to a first target virtualized object and reassigning at least a second server object from the failing virtualized object to at least a second target virtualized object. One or more virtual disks may be assigned to the failing virtualized object and utilized by the one or more server objects. Reassigning the one or more server objects from the failing virtualized object to the one or more target virtualized objects may include unassigning the one or more virtual disks assigned to the failing virtualized object, thus defining one or more unassigned virtual disks and assigning the one or more unassigned virtual disks to the one or more target virtualized objects.

In another implementation, a computer program product resides on a computer readable medium that has a plurality of instructions stored on it. When executed by a processor, the instructions cause the processor to perform operations including identifying a failing virtualized object within a virtualized computing environment, wherein the failing virtualized object executes one or more server objects. Other virtualized objects included within the virtualized computing environment are analyzed to identify one or more target virtualized objects. The one or more server objects are reassigned from the failing virtualized object to the one or more target virtualized objects.

One or more of the following features may be included. The failing virtualized object may be chosen from the group consisting of a virtual machine and a container. Analyzing other virtualized objects included within the virtualized computing environment to identify one or more target virtualized objects may include determining a workload experienced by each of the other virtualized objects included within the virtualized computing environment. Analyzing other virtualized objects included within the virtualized computing environment to identify one or more target virtualized objects may include determining a quantity of server objects being executed by each of the other virtualized objects included within the virtualized computing environment. Reassigning the one or more server objects from the failing virtualized object to the one or more target virtualized objects may include reassigning a first server object from the failing virtualized object to a first target virtualized object and reassigning at least a second server object from the failing virtualized object to at least a second target virtualized object. One or more virtual disks may be assigned to the failing virtualized object and utilized by the one or more server objects. Reassigning the one or more server objects from the failing virtualized object to the one or more target virtualized objects may include unassigning the one or more virtual disks assigned to the failing virtualized object, thus defining one or more unassigned virtual disks and assigning the one or more unassigned virtual disks to the one or more target virtualized objects In another implementation, a computing system includes at least one processor and at least one memory architecture coupled with the at least one processor, wherein the computing system is configured to perform operations including identifying a failing virtualized object within a virtualized computing environment, wherein the failing virtualized object executes one or more server objects. Other virtualized objects included within the virtualized computing environment are analyzed to identify one or more target virtualized objects. The one or more server objects are reassigned from the failing virtualized object to the one or more target virtualized objects.

One or more of the following features may be included. The failing virtualized object may be chosen from the group consisting of a virtual machine and a container. Analyzing other virtualized objects included within the virtualized computing environment to identify one or more target virtualized objects may include determining a workload experienced by each of the other virtualized objects included within the virtualized computing environment. Analyzing other virtualized objects included within the virtualized computing environment to identify one or more target virtualized objects may include determining a quantity of server objects being executed by each of the other virtualized objects included within the virtualized computing environment. Reassigning the one or more server objects from the failing virtualized object to the one or more target virtualized objects may include reassigning a first server object from the failing virtualized object to a first target virtualized object and reassigning at least a second server object from the failing virtualized object to at least a second target virtualized object. One or more virtual disks may be assigned to the failing virtualized object and utilized by the one or more server objects. Reassigning the one or more server objects from the failing virtualized object to the one or more target virtualized objects may include unassigning the one or more virtual disks assigned to the failing virtualized object, thus defining one or more unassigned virtual disks and assigning the one or more unassigned virtual disks to the one or more target virtualized objects.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
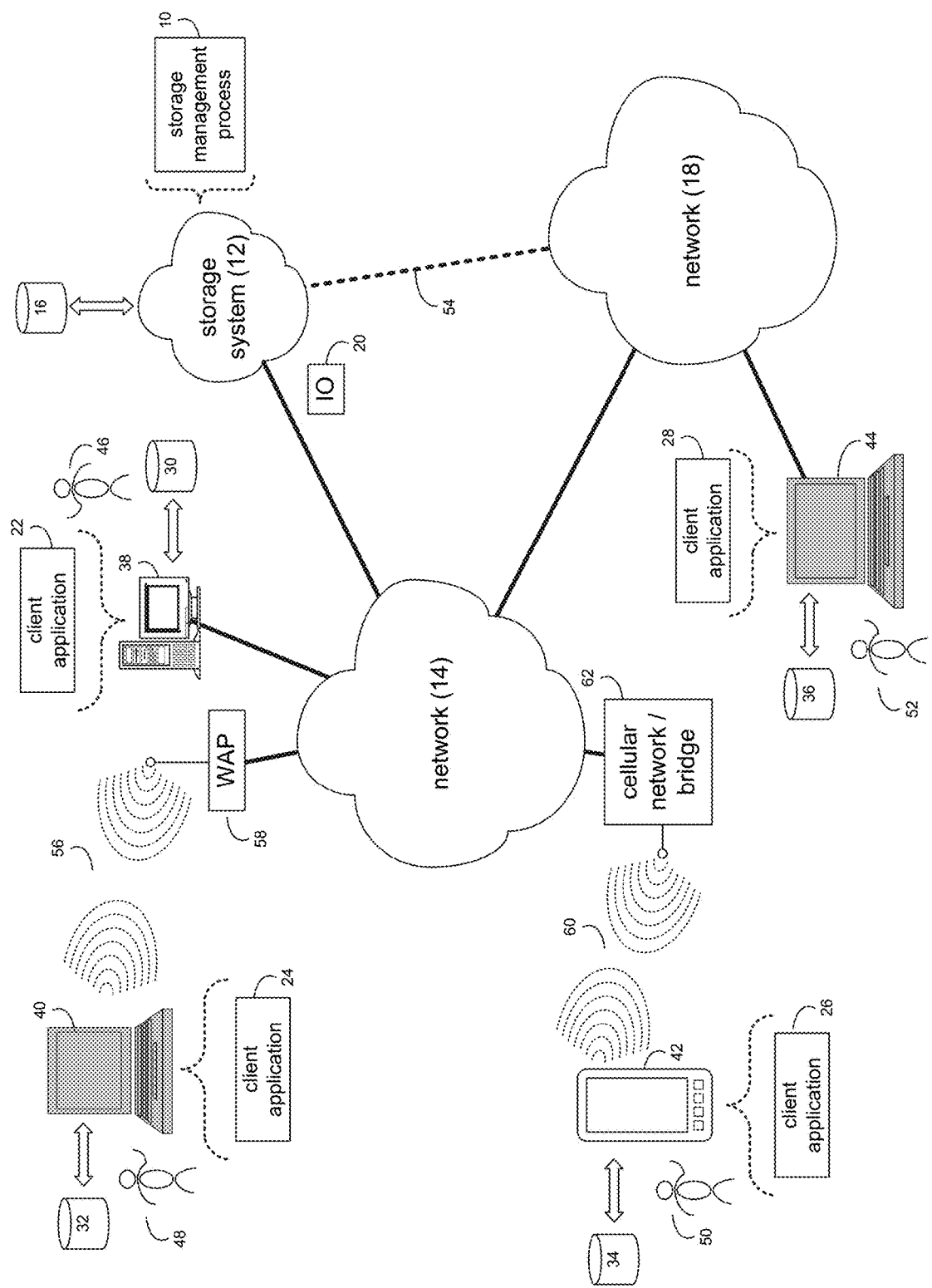
FIG. 1 is a diagrammatic view of a storage system and a storage management process coupled to a distributed computing network.

Referring to FIG. 1, there is shown storage management process 10 that may reside on and may be executed by storage system 12, which may be connected to network 14 (e.g., the Internet or a local area network). Examples of storage system 12 may include, but are not limited to, high-availability storage systems such as: a Network Attached Storage (NAS) system, a Storage Area Network (SAN), a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server tm; Redhat Linux tm, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various 10 requests (e.g. 10 request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows tm, Apple Macintosh tm, Redhat Linux tm, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
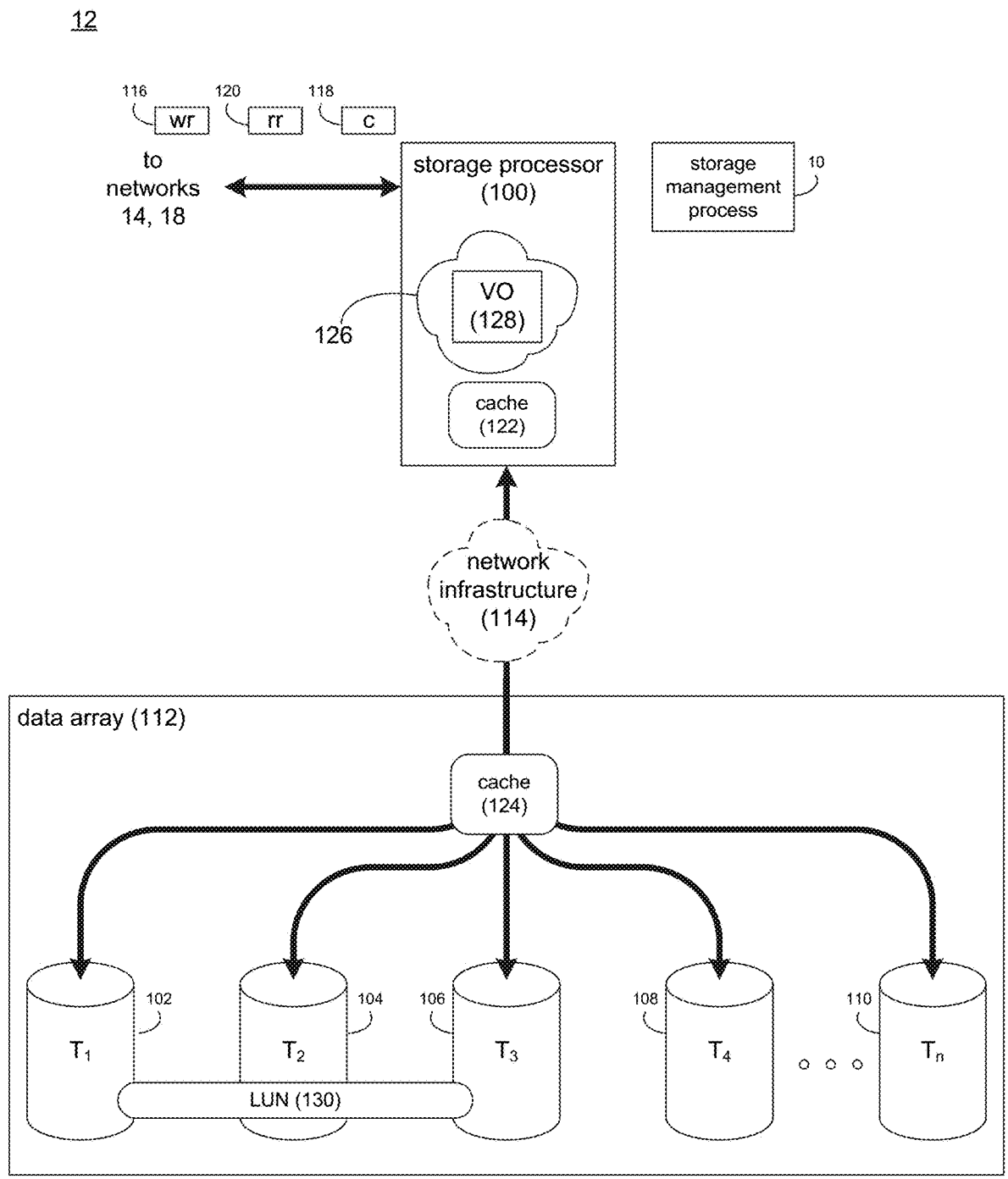
FIG. 2 is a diagrammatic view of an implementation of the storage system of FIG. 1.

Referring also to FIG. 2, there is shown one particular implementation of storage system 12. Storage system 12 may include storage processor 100 and a plurality of storage targets T1-n (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various 10 requests (e.g. 10 request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Depending on the manner in which storage system 12 is configured, storage system 12 may be configured to execute virtual operating environment 126. An example of virtual operating environment 126 may include but is not limited to a hypervisor, which is an instantiation of an operating/file system that may allow for one or more virtualized objects (e.g., virtualized object 128) to operate within a single physical device. Examples of virtualized object 128 may include but are not limited to a virtual machine, a container, or some other form of virtualized object.

Accordingly, the combination of virtual operating environment 126 and virtualized object 128 may allow one or more users to access the resources of storage processor 100 (and one or more additional storage processors, not shown) and data array 112 (and one or more additional data arrays, not shown). Through the use or storage system 12 and/or virtual operating environment 126, one or more LUNs (e.g., LUN 130) may be defined.

As is known in the art, LUN is an acronym for Logical Unit Number, which is a unique identifier that may designate one or more physical or virtual storage devices that are configured to execute I/O commands on a host computer.

Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

Figure 3:
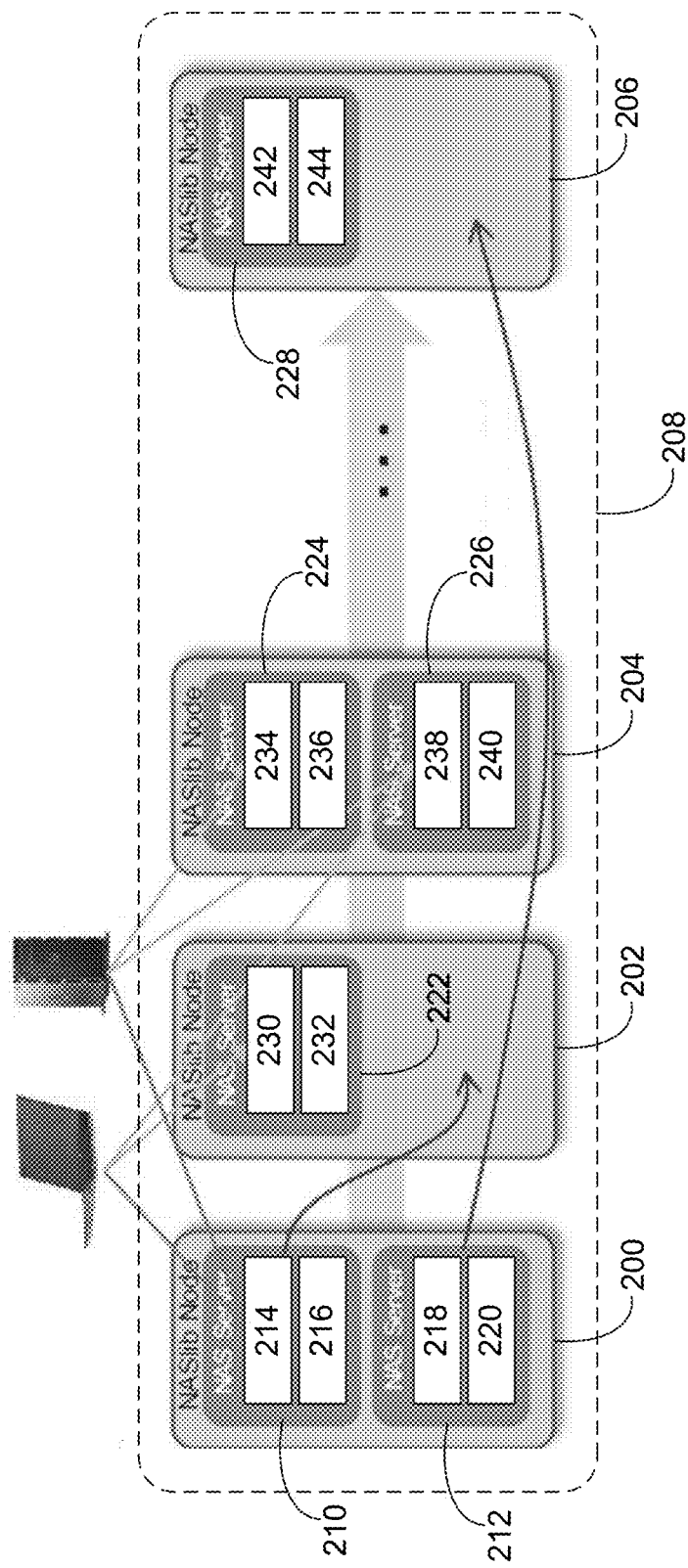
FIG. 3 is a diagrammatic view of another implementation of the storage system of FIG. 1.

Referring also to FIG. 3, there is shown another implementation of storage system 12, wherein storage system 12 is shown to include a plurality of virtualized objects (e.g., virtualized objects 200, 202, 204, 206). Depending upon the manner in which storage system 12 is configured, virtualized objects 200, 202, 204, 206 may be executed on one physical device (e.g., storage processor 100) or a plurality of physical devices (e.g., storage processor 100 in combination with other storage processors, not shown). As discussed above, examples of virtualized objects 200, 202, 204, 206 may include virtual machines and containers. As is known in the art, a container is an operating system level virtualization method for deploying and running distributed applications without the need to launch an entire virtual machine for each application deployed.

While storage system 12 is shown to include four virtualized objects (e.g., virtualized objects 200, 202, 204, 206), this is for illustrative purposes only and is not intended to be a limitation of this disclosure, as other configurations are possible and are considered to be within the scope of this disclosure. For example, the number of virtualized objects (e.g., virtualized objects 200, 202, 204, 206) may be increased or decreased depending upon the design criteria of storage system 12.

Assume for the following example that during the course of operation of storage system 12, virtualized object 200 begins to fail (or fails). The cause of the failure of virtualized object 200 may be from e.g., a software issue concerning virtualized object 200 itself, a software issue concerning the virtual operating environment (e.g., virtual operating environment 126) within which virtualized object 200 is operating and/or a hardware issue concerning the physical device upon which virtualized object 200 and/or the related virtual operating environment (e.g., virtual operating environment 126) is operating.

Figure 4:
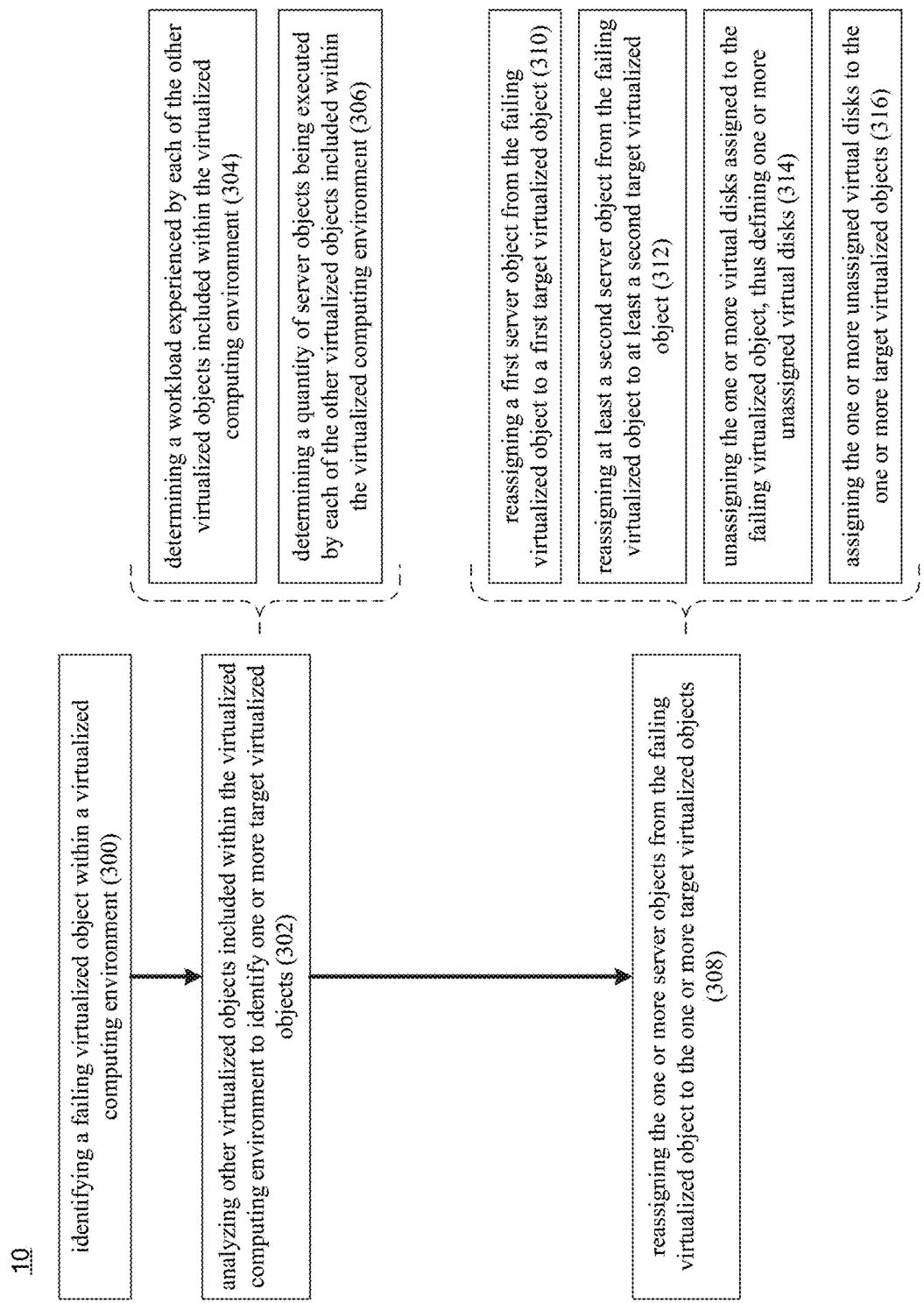
FIG. 4 is a flow chart of the storage management process of FIG. 1.

Accordingly and referring also to FIG. 4, storage management process 10 may identify 300 a failing virtualized object (e.g., virtualized object 200) within a virtualized computing environment (e.g., NAS system cluster 208). This failing virtualized object (e.g., virtualized object 200) may execute one or more server objects (e.g., server objects 210, 212). One example of server objects 210, 212 may include but are not limited to NAS server objects that may be configured to effectuate one of more virtualized software functionalities within storage system 12.

For this example, also assume that one or more virtual disks are assigned to the failing virtualized object (e.g., virtualized object 200) and are utilized by the server objects (e.g., server objects 210, 212) executed by the failing virtualized object (e.g., virtualized object 200). Specifically, assume that four virtual disks (e.g., LUNs 214, 216, 218, 220) are assigned to virtualized object 200, wherein LUNs 214, 216 are utilized by server object 210 and LUNs 218, 220 are utilized by server object 212.

Upon identifying 300 virtualized object 200 within NAS system cluster 208 as a failing virtualized object, storage management process 10 may analyze 302 other virtualized objects included within the virtualized computing environment (e.g., NAS system cluster 208) to identify one or more target virtualized objects.

For example and when analyzing 302 other virtualized objects (e.g., virtualized objects 202, 204, 206) included within NAS system cluster 208 to identify one or more target virtualized objects, storage management process 10 may determine 304 a workload experienced by each of the other virtualized objects (e.g., virtualized objects 202, 204, 206) included within NAS system cluster 208. Therefore, the quantity of individual processes (e.g., input/output operations, CPU operations, network operations, storage operations) being performed by each of virtualized objects 202, 204, 206 may be determined 304 by storage management process 10 so that the overall workload experienced by virtualized objects 202, 204, 206 may be scrutinized, wherein too high a workload may disqualify one or more of virtualized objects 202, 204, 206 from being considered a target virtualized object.

Additionally and when analyzing 302 other virtualized objects (e.g., virtualized objects 202, 204, 206) included within NAS system cluster 208 to identify one or more target virtualized objects, storage management process 10 may determine 306 a quantity of server objects being executed by each of the other virtualized objects (e.g., virtualized objects 202, 204, 206) included within NAS system cluster 208. Therefore, the quantity of server objects being executed by each of virtualized objects 202, 204, 206 may be determined 306 by storage management process 10 so that the overall workload experienced by virtualized objects 202, 204, 206 may be scrutinized, wherein too many server objects may disqualify one or more of virtualized objects 202, 204, 206 from being considered a target virtualized object. For example, storage management process 10 may determine 306 that virtualized object 202 is executing server object 222; virtualized object 204 is executing server objects 224, 226; and virtualized object 206 is executing server object 228.

As discussed above, one or more virtual disks may be assigned to a virtualized object (e.g., virtualized objects 202, 204, 206), wherein these virtual disks may be utilized by server objects executed by these virtualized objects (e.g., virtualized objects 202, 204, 206). Specifically, assume that:

- two virtual disks (e.g., LUNs 230, 232) are assigned to virtualized object 202, wherein LUNs 230, 232 are utilized by server object 222;
- four virtual disks (e.g., LUNs 234, 236, 238, 240) are assigned to virtualized object 204, wherein LUNs 234, 236 are utilized by server object 224 and LUNs 238, 240 are utilized by server object 226; and
- two virtual disks (e.g., LUNs 242, 244) are assigned to virtualized object 206, wherein LUNs 242, 244 are utilized by server object 228.

Accordingly and when analyzing 302 other virtualized objects (e.g., virtualized objects 202, 204, 206) included within NAS system cluster 208 to identify one or more target virtualized objects, the quantity of server objects determined 306 to be executed by each of virtualized objects 202, 204, 206 (as well as the number of virtual disks utilized by related server objects) may all be considered by storage management process 10.

Continuing with the above-stated example, assume that storage management process 10 analyzes 302 the other virtualized objects (e.g., virtualized objects 202, 204, 206) included within NAS system cluster 208 and identifies virtualized objects 202, 206 as target virtualized objects. Accordingly, storage management process 10 may reassign 308 the one or more server objects (e.g., server objects 210, 212) from the failing virtualized object (e.g., virtualized object 200) to the one or more target virtualized objects (e.g., virtualized objects 202, 206).

When reassigning 308 the one or more server objects (e.g., server objects 210, 212) from the failing virtualized object (e.g., virtualized object 200) to the one or more target virtualized objects (e.g., virtualized objects 202, 206), the server objects (e.g., server objects 210, 212) may be reassigned 308 in a manner that distributes the workload that was being borne by the failing virtualized object (e.g., virtualized object 200) across multiple target virtualized objects.

For example and when reassigning 308 the one or more server objects (e.g., server objects 210, 212) from the failing virtualized object (e.g., virtualized object 200) to the one or more target virtualized objects (e.g., virtualized objects 202, 206), storage management process 10 may: reassign 310 a first server object (e.g., server object 210) from the failing virtualized object (e.g., virtualized object 200) to a first target virtualized object (e.g., virtualized object 202); and may reassign 312 at least a second server object (e.g., server object 212) from the failing virtualized object (e.g., virtualized object 200) to at least a second target virtualized object (e.g., virtualized object 206), thus spreading out the workload amongst a plurality of target virtualized objects.

As discussed above, one or more virtual disks may be assigned to the failing virtualized object (e.g., virtualized object 200) and may be utilized by the one or more server objects (e.g., server objects 210, 212) executed by the failing virtualized object (e.g., virtualized object 200).

Accordingly and when reassigning 308 the one or more server objects (e.g., server objects 210, 212) from the failing virtualized object (e.g., virtualized object 200) to the one or more target virtualized objects (e.g., virtualized objects 202, 206), storage management process 10 may unassign 314 the one or more virtual disks assigned to the failing virtualized object (e.g., virtualized object 200), thus defining one or more unassigned virtual disks. As discussed above, assume that four virtual disks (e.g., LUNs 214, 216, 218, 220) are assigned to virtualized object 200, wherein LUNs 214, 216 are utilized by server object 210 and LUNs 218, 220 are utilized by server object 212. Accordingly, storage management process 10 may unassign 314 the four virtual disks (e.g., LUNs 214, 216, 218, 220) assigned to the failing virtualized object (e.g., virtualized object 200), thus defining four unassigned virtual disks (e.g., LUNs 214, 216, 218, 220).

Further and when reassigning 308 the one or more server objects (e.g., server objects 210, 212) from the failing virtualized object (e.g., virtualized object 200) to the one or more target virtualized objects (e.g., virtualized objects 202, 206), storage management process 10 may assign 316 the one or more unassigned virtual disks (e.g., LUNs 214, 216, 218, 220) to the one or more target virtualized objects (e.g., virtualized objects 202, 206). Specifically, storage management process 10 may assign 316 LUNs 214, 216 to virtualized object 202 and may assign 316 LUNs 218, 220 to virtualized object 206, wherein LUNs 214, 216 may be utilized by server object 210 and LUNs 218, 220 may be utilized by server object 212.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    identifying a failing virtualized object within a virtualized computing environment, wherein the failing virtualized object executes one or more server objects;
    analyzing other virtualized objects included within the virtualized computing environment to identify one or more target virtualized objects, wherein analyzing other virtualized objects included within the virtualized computing environment includes:
        determining a workload experienced by each of the other virtualized objects included within the virtualized computing environment, wherein identifying the one of more target virtualized objects includes disqualifying virtualized objects which have too high of a workload from identification as target virtualized objects;
        determining a quantity of server objects being executed by each of the other virtualized objects included within the virtualized computing environment, wherein identifying the one or more target virtualized objects includes disqualifying virtualized objects which exceed a threshold amount of server objects from identification as target virtualized objects; and
    reassigning the one or more server objects from the failing virtualized object to the one or more target virtualized objects.

2. The computer-implemented method of claim 1 wherein the failing virtualized object is chosen from a group consisting of:
    a virtual machine; and
    a container.

3. The computer-implemented method of claim 1 wherein reassigning the one or more server objects from the failing virtualized object to the one or more target virtualized objects includes:
    reassigning a first server object from the failing virtualized object to a first target virtualized object; and
    reassigning at least a second server object from the failing virtualized object to at least a second target virtualized object.

4. The computer-implemented method of claim 1 wherein one or more virtual disks are assigned to the failing virtualized object and utilized by the one or more server objects.

5. The computer-implemented method of claim 4 wherein reassigning the one or more server objects from the failing virtualized object to the one or more target virtualized objects includes:

unassigning the one or more virtual disks assigned to the failing virtualized object, thus defining one or more unassigned virtual disks; and assigning the one or more unassigned virtual disks to the one or more target virtualized objects.

6. A computer program product residing on a non-transitory computer readable medium having a plurality of instructions stored thereon which, when executed by a processor, cause the processor to perform operations comprising:

identifying a failing virtualized object within a virtualized computing environment, wherein the failing virtualized object executes one or more server objects;

analyzing other virtualized objects included within the virtualized computing environment to identify one or more target virtualized objects, wherein analyzing other virtualized objects included within the virtualized computing environment includes:

determining a workload experienced by each of the other virtualized objects included within the virtualized computing environment, wherein identifying the one of more target virtualized objects includes disqualifying virtualized objects which have too high of a workload from identification as target virtualized objects;

determining a quantity of server objects being executed by each of the other virtualized objects included within the virtualized computing environment, wherein identifying the one or more target virtualized objects includes disqualifying virtualized objects which exceed a threshold amount of server objects from identification as target virtualized objects; and reassigning the one or more server objects from the failing virtualized object to the one or more target virtualized objects.

7. The computer program product of claim 6 wherein the failing virtualized object is chosen from a group consisting of:

a virtual machine; and
a container.

8. The computer program product of claim 6 wherein reassigning the one or more server objects from the failing virtualized object to the one or more target virtualized objects includes:

reassigning a first server object from the failing virtualized object to a first target virtualized object; and reassigning at least a second server object from the failing virtualized object to at least a second target virtualized object.

9. The computer program product of claim 6 wherein one or more virtual disks are assigned to the failing virtualized object and utilized by the one or more server objects.

10. The computer program product of claim 9 wherein reassigning the one or more server objects from the failing virtualized object to the one or more target virtualized objects includes:

unassigning the one or more virtual disks assigned to the failing virtualized object, thus defining one or more unassigned virtual disks; and assigning the one or more unassigned virtual disks to the one or more target virtualized objects.

11. A computing system comprising:

a memory; and a processor configured to identify a failing virtualized object within a virtualized computing environment, wherein the failing virtualized object executes one or more server objects;

the processor further configured to analyze other virtualized objects included within the virtualized computing environment to identify one or more target virtualized objects, wherein as part of the analysis of other virtualized objects the processor is configured to determine a workload experienced by each of the other virtualized objects included within the virtualized computing environment, wherein as part of the identification of target virtualized objects the processor is configured to disqualify virtualized objects which have too high of a workload from identification as target virtualized objects, wherein as part of the analysis of other virtualized objects the processor is configured to determine a quantity of server objects being executed by each of the other virtualized objects included within the virtualized computing environment, and wherein as part of the identification of target virtualized objects the processor is configured to disqualify virtualized objects which exceed a threshold amount of server objects from identification as target virtualized objects; and the processor further configured to reassign the one or more server objects from the failing virtualized object to the one or more target virtualized objects.

12. The computing system of claim 11 wherein the processor is configured to choose the failing virtualized object from a group consisting of:

a virtual machine; and
a container.

13. The computing system of claim 11 wherein reassigning the one or more server objects from the failing virtualized object to the one or more target virtualized objects includes:

reassigning a first server object from the failing virtualized object to a first target virtualized object; and reassigning at least a second server object from the failing virtualized object to at least a second target virtualized object.

14. The computing system of claim 11 wherein the processor is further configured to assign one or more virtual disks to the failing virtualized object and the one or more server objects are configured to utilize the one or more virtual disks.

15. The computing system of claim 14 wherein reassigning the one or more server objects from the failing virtualized object to the one or more target virtualized objects includes:

unassigning the one or more virtual disks assigned to the failing virtualized object, thus defining one or more unassigned virtual disks; and assigning the one or more unassigned virtual disks to the one or more target virtualized objects.

* * * * *